United States Patent Office 3,391,362
Patented July 2, 1968

3,391,362
SUPERCONDUCTING MAGNET COIL
Cord Albrecht, Erlangen-Bruck, and Wilhelm Kafka, Tennenlohe, Germany, assignors to Siemens Aktiengesellschaft, a corporation of Germany
Filed Oct. 21, 1965, Ser. No. 499,146
Claims priority, application Germany, Dec. 17, 1964, S 94,663
8 Claims. (Cl. 335—216)

ABSTRACT OF THE DISCLOSURE

A superconducting magnet coil includes a band winding of a pluarity of turns of superconducting material, ohmic resistance bridges consisting of conductive material interposed between adjacent turns of the band winding, the bridges having a high resistance relative to that of the winding when the winding is in a superconductive state and a low resistance relative to that of a portion of a turn of the winding when the winding is in the normally conducting state, whereby excessive voltage and the heat concentration due to local initiation of transition in the winding is prevented.

Specification

This invention relates to superconducting magnet coils. More particularly, it relates to such improved coils wherein the high voltages and heat concentrations which occur at individual portions of the coil resulting from the transition from superconductance to normal conductance are substantially eliminated.

Where large magnets are provided from superconducting coils, an intentionally or unintentionally effected transition from superconductance to normal conductance in such coils may result in high voltages and great heat concentrations at particular individual locations in the coil windings. Such high voltages and large heat concentrations may cause damage to or destroy a coil winding insulation or may melt the superconductor at these locations, thereby rendering the coil inoperative.

In the U.S. patent application of Wilhelm Kafka and Friedhelm Depping for "Superconducting Magnet Coil," Ser. No. 428,676, filed Jan. 28, 1965, now Patent No. 3,336,549, and assigned to the assignee of this application, there is disclosed a superconducting magnet coil which comprises a winding of superconducting material having axially sequential winding turns and ohmic resistance bridges interposed between adjacent turns and resistively interconnecting these turns. These bridges have a high resistance relative to that of the winding when the winding is in the superconducting state to limit the bridge current to permissible values during build-up periods of coil excitation. The bridge resistance is lower than that of a given fractional length of a single winding turn when the latter turn is in a normally conductive state. As a result of this arrangement, excessive heat concentration produced by local initiation of transition from the superconducting to the normal conducting state in the winding is prevented.

It is an important object of this invention to provide a superconducting magnet coil as disclosed in the aforementioned application, i.e., one in which excessive voltages and excessive heat concentrations in individual parts of the winding due to occurrence of transitions are effectively prevented with the improvement that the transition is caused to be rapidly propagated.

This object is achieved by providing for the purpose of effecting a rapid propagation of the transition, a plurality of ohmic resistance bridges between adjacent windings of the coil. The resistance values of these bridges are chosen to be of a magnitude sufficient such that the current, which flows through a bridge upon the excitation of the coil whereby the coil is heated by such current, is prevented from attaining a value which might prove damaging to the superconducting properties of the coil. It has been found to be particularly advantageous if the resistance bridges are continually distributed between adjacent winding turns of the coil. This may be effected, as disclosed in the above-mentioned patent application, by either coating the coil wire with a conducting varnish or by impregnating the windings in an electrically conductive material employing separating means such as glass fibers. The superconducting magnet coil comprising resistance bridges which are continuously distributed between adjacent winding turns as described in the hereinabove referred to patent application is improved upon by the providing of a band-shaped conductor.

A band or tape-shaped conductor is particularly advantageous in a continuous distribution of resistance bridges since the ratio of its surface area to its cross-sectional area is especially great whereby the bridging from the superconductor to the semiconducting intermediate material is quite good. In addition, bands or tapes may be employed to effect a cost saving since they are cheaper to produce than drawn wires as only a negligible oxide layer forms on the band-type structure and a subsequent processing to remove such oxide layer is substantially unnecessary and superfluous.

Generally speaking and in accordance with the invention, there is provided a superconducting magnet coil comprising a band winding of a plurality of turns of superconducting material with ohmic resistance bridges interposed between adjacent turns of the band winding. The latter bridges have a high resistance relative to that of a winding when the winding is in a superconducting state and a low resistance relative to that of a portion of a turn of the winding when the winding is in the normally conducting state, whereby excessive voltage and heat concentration due to local initiation of transition from the winding's superconductive to normally conductive state is prevented.

The foregoing and more specific objects of our invention will be apparent from and will be mentioned in the following description of a superconducting magnet coil according to the invention taken in conjunction with the accompanying drawing.

Figure 1:
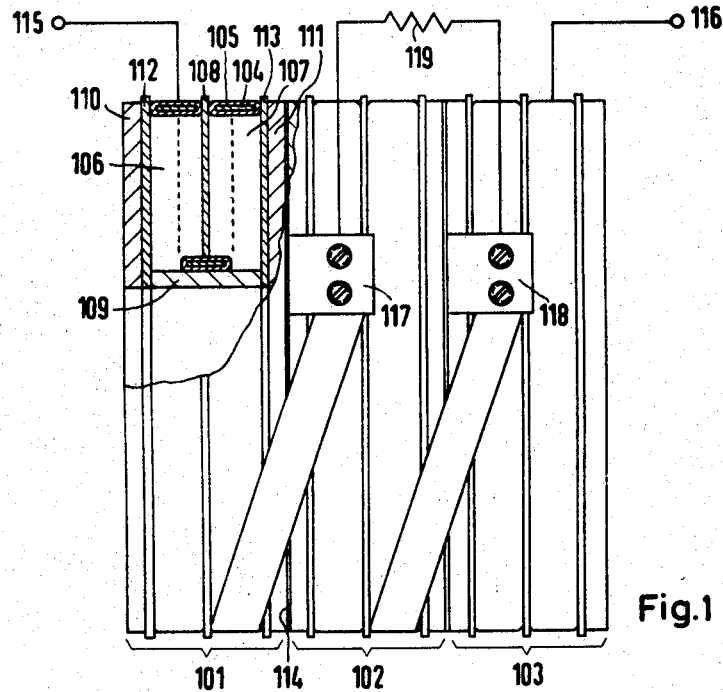
FIG. 1 is an elevational view, partly in section and partly schematic, of an illustrative embodiment of a superconducting magnet coil constructed in accordance with the principles of the invention.

Referring now to FIG. 1 wherein there is shown an illustrative embodiment of a superconducting magnet coil constructed according to the invention, the coil shown therein comprises three disc windings 101, 102 and 103 respectively, winding 101 being shown partly in cross-section. The conductor which is employed is a band 104, suitably comprising niobium-zirconium, for example. Band 104 may suitably have a thickness of about 0.03 mm. and a width of about 3 mm. Band 104 may suitably have a coating 105 thereon of conductive varnish, coating 105 having a thickness of about 0.003 mm. The conductive varnish constituting coating 105 may suitably comprise, for example, colloidally dispersed graphite, carbon and/or metal. The disc windings 101, 102 and 103 all comprise respectively two band coils 106 and 107 which are suitably electrically insulated from each other by an insulating layer 108. The coil body 109 may be a copper cylinder, for example. The lateral boundary of the coil is effected by discs 110 and 111, which are suitably comprised of copper. Insulating layers 112 and 113 are provided between discs 110 and 111 and the winding turns 106 and 107 respectively.

The band conductor, as shown in section, in FIG. 1 is produced in the following manner. First, the center portion of the whole band is wound on copper cylinder 109 without any intermediate insulating layer and in a manner whereby a coil winding turn results from the pitch of a band width. One end part of the band is then wound in region 106 and the other part is wound in region 107. One half of the band is thereafter wound as a disc while the other half is simultaneously rotated along, wound on a carrier coil. Then the other half is wound as a disc in the opposite rotating direction. In this manner, both disc coils 106 and 107 have the same winding direction. The insulation layer 108 is then inserted between disc winding portions 106 and 107. Insulating layers 112 and 113 are disposed laterally against the disc winding portions 106 and 107 respectively and copper discs 110 and 111 are laid against layers 112 and 113 respectively. The total assembled structure then may be potted in a cast resin whereby a unitary solid body results. In the embodiment example shown in FIG. 1, a plurality of disc-type windings as herein described are combined into a coil. Cement, as depicted by layer 114 in FIG. 1, is provided between the coil portions, and which functions to uniformly distribute the magnetic axial pressure across the entire area of the disc.

The specific conductivity of the conducting varnish constituting coating 105 should suitably be chosen in dependence upon the size of the coil. Thus, in a coil having an inner diameter of 30 cm. and the above-mentioned band dimensions, a suitable specific resistance therefor is approximately 100 ohm-cm.

Electrical terminals 115 and 116 are for connecting the coil in electrical circuit. The electrical connection between the individual portions comprising the coil is effected by terminal connections 117 and 118, a more detailed depiction of one of connections 117 and 118 being shown in FIG. 2. An electrical resistance 119 of a relatively low value is inserted, as shown, between connections 117 and 118, exterior to the coil, resistance 119 having the same function as conducting varnish layer 105 on the superconducting band, i.e., to accelerate the propagation of the transition from the superconductive to the normally conductive state. The value of resistance 119 is so chosen whereby it is relatively small as compared to the value of the resistance of the bridged coil portion when the latter is in a normally conducting state. Suitably, the conducting varnish constituting layer 105 should have a somewhat higher specific resistance, such as about 500 ohm-cm. rather than 100 ohm-cm. (in accordance with the dimensions of the example described hereinabove), when coil portions are bridged by a resistance of relatively low value, since the latter resistance creates an additional current path.

Figure 2:
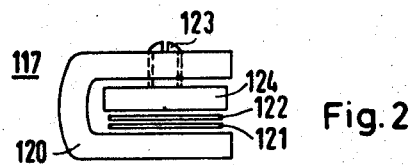
FIG. 2 is a depiction of an electrical connection suitably utilized in the embodiment shown in FIG. 1 for connecting respective coil portions therein.

The terminal connection 117, shown in FIG. 2, suitably comprises a flexible U-shaped body portion 120 which may suitably comprise steel. Numerals 121 and 122 respectively denote superconducting bands of adjacent coil portions. Numeral 123 denotes a terminal screw and numeral 124 denotes a terminal contact 124.

Figure 3:
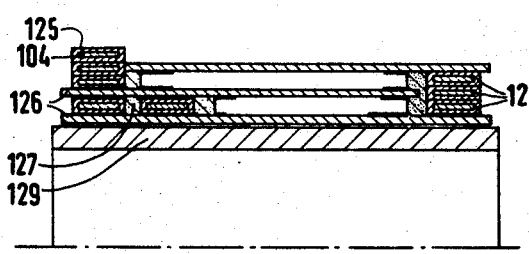
FIG. 3 is a cross-sectional view of another embodiment according to the invention.

FIG. 3 shows a coil which is wound lengthwise. In this embodiment example, the superconducting band 104 is provided with a thin coating 125 thereon, suitably comprising silver or copper. In each layer, the band is spirally wound on an insulating foil 126 in a manner such that empty space 127, suitably of about 0.5 mm., for example, is defined between adjacent winding turns. A conductive varnish or a conductive cast resin is used to fill space 127. At the junction of adjacent layers, several winding turns 128 of the superconductor are always directly wound on top of each other without an insulating layer. Thereby, the junction locality is shunted and protected. The structure 129 carrying the coil winding may suitably be a copper cylinder, as is the corresponding carrier structure in the embodiment disclosed in FIG. 1.

The coil may or may not be provided with a lateral flange. If, for the purpose of better heat conduction and removal, flanges or copper foils are provided between the individual layers of coil windings, care must be taken to insure that such copper foils do not come into direct contact with the conducting varnish.

In the arrangement of the embodiment depicted in FIG. 3, a different specific resistance results in the conducting varnish for the same band cross-section than in the arrangement of the embodiment depicted in FIG. 1 because of the different geometries of these arrangements respectively. In the arrangement of FIG. 3, the specific resistance would be about $10^{-2}$ ohm-cm. for a coil having an inner diameter of about 30 cm. Such conducting varnish may be obtained through the addition of finely distributed silver.

It would be obvious to those skilled in the art upon studying this disclosure that superconducting magnet coils according to our invention permit of a great variety of modifications and hence can be given embodiments other than those particularly illustrated herein without departing from the essential features of our invention and within the scope of the claims annexed hereto.

We claim:

1. A superconducting magnet coil comprising a band winding of a plurality of turns of superconducting material, said winding being in the form of a disc, ohmic resistance bridges consisting of conductive material interposed between adjacent turns of said band winding in mutual electrically conductive contact with said adjacent turns, said bridges having a high resistance relative to that of said winding when said winding is in a superconductive state and a low resistance relative to that of a portion of a turn of said winding when said winding is in the normally conducting state, whereby excessive voltage and heat concentration due to local initiation of transition in the winding is prevented.

2. A superconducting magnet coil as defined in claim 1 wherein said coil comprises at least two disc windings disposed adjacent each other and further including an electrical connection therebetween.

3. A superconducting magnet coil as defined in claim 2 and further including an insulating layer provided intermediate said discs.

4. A superconducting magnet coil comprising a band winding of a plurality of turns of superconducting material, ohmic resistance bridges consisting of conductive material interposed between adjacent turns of said band winding, said conductive material being selected from the group consisting of a conductive varnish and a conductive cast resin, said bridges having a high resistance relative to that of said winding when said winding is in a superconductive state and a low resistance relative to that of a portion of a turn of said winding when said winding is in the normally conducting state, whereby excessive voltage and heat concentration due to local initiation of transition in the winding is prevented.

5. A superconducting magnet coil comprising a band winding of a plurality of turns of superconducting material, ohmic resistance bridges consisting of conductive material interposed between adjacent turns of said band winding, said band winding having a coating of a conductive varnish thereon, said bridges having a high resistance relative to that of said winding when said winding is in a superconductive state and a low resistance relative to that of a portion of a turn of said winding when said winding is in the normally conducting state, whereby excessive voltage and heat concentration due to local initiation of transition in the winding is prevented.

6. A superconducting magnet coil as defined in claim 4 wherein said varnish comprises a dispersion of a material selected from the group consisting of graphite, carbon, copper and silver.

7. A superconducting magnet coil comprising a band winding of a plurality of turns of superconducting material, said winding having a plurality of superposed layers of adjacent turns, said turns being laterally spaced from one another, the space between said turns being filled with conductive material, and said layers of turns being separated from one another by layers of insulating material, ohmic resistance bridges consisting of conductive material interposed between adjacent turns of said band winding, said bridges having a high resistance relative to that of said winding when said winding is in a superconductive state and a low resistance relative to that of a portion of a turn of said winding when said winding is in the normally conducting state, whereby excessive voltage and heat concentration due to local initiation of transition in the winding is prevented.

8. Superconducting magnet coil according to claim 7, wherein said layers of turns are joined to one another, and said insulating layers are disposed in alternating sequence between said superposed layers of turns so that a plurality of turns are directly superposed at the junctions between said layers of turns.

References Cited

UNITED STATES PATENTS 3,233,154   2/1966   Hnilicka _____ 335—299 XR

BERNARD A. GILHEANY, *Primary Examiner.*

GEORGE HARRIS, *Examiner.*